United States Patent [19]

Hurn et al.

[11] Patent Number: 4,946,226
[45] Date of Patent: Aug. 7, 1990

[54] VEHICLE SEAT ASSEMBLY WITH ATTITUDE ADJUSTABLE ARMREST

[75] Inventors: Randy D. Hurn, Livonia; John W. Green, Oak Park, both of Mich.

[73] Assignee: Hoover Universal, Inc., Ann Arbor, Mich.

[21] Appl. No.: 383,715

[22] Filed: Jul. 24, 1989

[51] Int. Cl.⁵ .................................................. A47C 7/54
[52] U.S. Cl. ....................................... 297/417; 297/374
[58] Field of Search .............. 297/115, 417, 411, 374; 248/412

[56] References Cited

U.S. PATENT DOCUMENTS

| | | | |
|---|---|---|---|
| 548,498 | 10/1895 | Andrén | 248/411 |
| 3,941,492 | 3/1976 | Meinunger | 248/411 X |
| 4,244,623 | 1/1981 | Hall et al. | 297/417 |
| 4,310,196 | 1/1982 | Vogel | 297/417 |
| 4,311,338 | 1/1982 | Moorhouse | 297/417 X |
| 4,313,638 | 2/1982 | Roper | 297/374 |
| 4,621,864 | 11/1986 | Hill | 297/417 X |
| 4,655,501 | 4/1987 | Ishigami et al. | 297/417 X |
| 4,674,790 | 6/1987 | Johnson | 297/417 X |

Primary Examiner—Peter A. Aschenbrenner
Attorney, Agent, or Firm—Harness, Dickey & Pierce

[57] ABSTRACT

A vehicle seat assembly with an attitude adjustable armrest is provided to enable the armrest to be adjusted to maintain a horizontal position when the seat back is reclined rearwardly. The attitude adjustment mechanism includes a cam lock which prevents downward rotation of the armrest while permitting upward rotation of the armrest. The cam lock mechanism includes a cam fixed to the seat back having an arcuate cam edge surface and a pawl having an edge surface engaging the cam surface. The pawl plate is attached to the armrest and spring biased into engagement with the cam plate to prevent downward rotation of the armrest. A release mechanism is provided to disengage the pawl from the cam to enable the armrest to be adjusted downwardly.

14 Claims, 3 Drawing Sheets

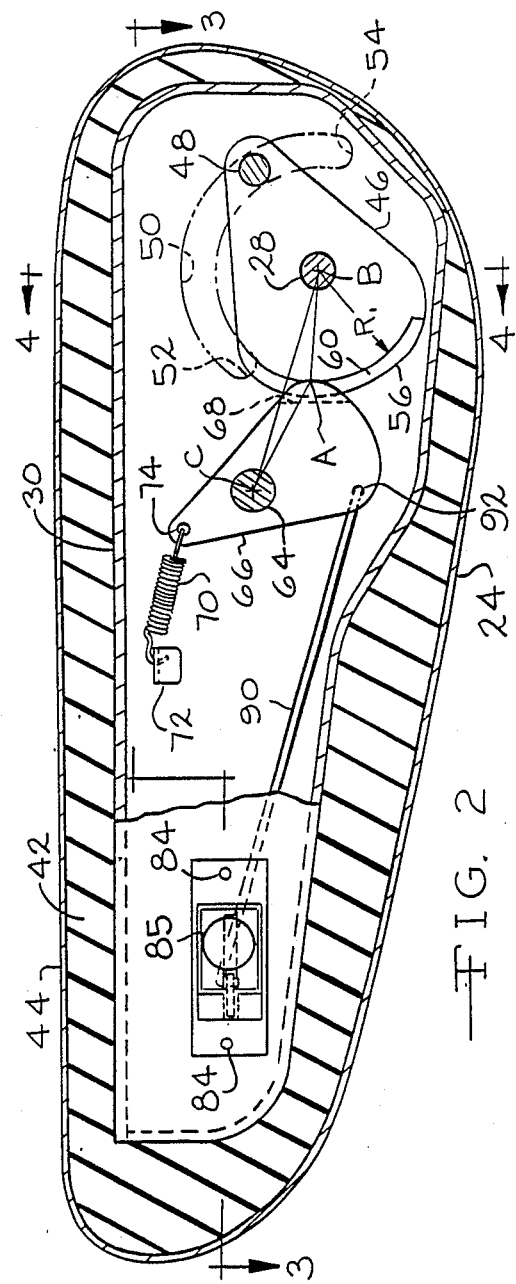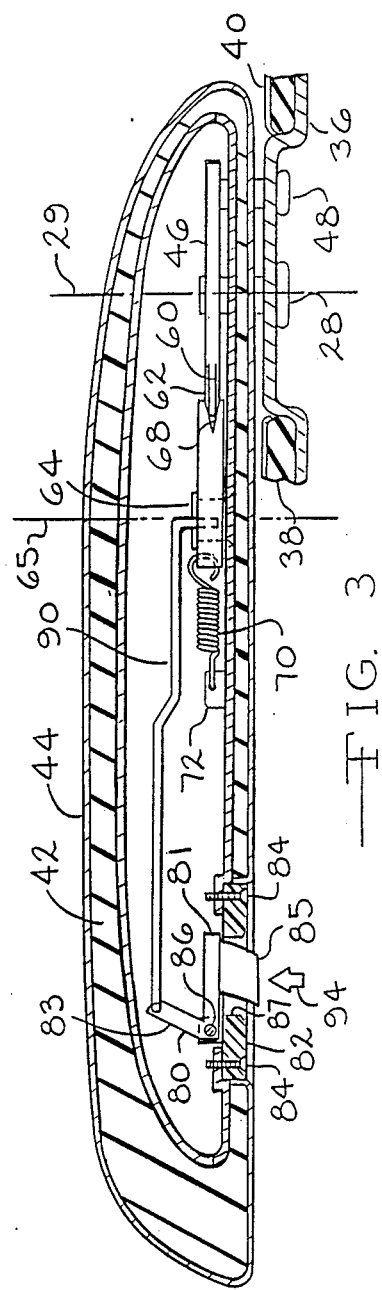

VEHICLE SEAT ASSEMBLY WITH ATTITUDE ADJUSTABLE ARMREST

BACKGROUND AND SUMMARY OF THE INVENTION

This invention relates to a vehicle seat assembly and in particular to a seat assembly with an armrest attitude adjustment mechanism to enable the armrest to be maintained in a normal, generally horizontal, position when the seat back is reclined within a given range of reclined positions.

It is not uncommon for vehicle seats, in particular bucket seats, to include a reclining feature to enable the angle of the seat back to be varied from a generally upright position to a reclined position within a given range. This enables the seat back to be adjusted, as desired, to accommodate various size occupants.

It is also not uncommon for bucket seats, particularly in vans, pick-up trucks and other multi-purpose passenger vehicles, to be equipped with armrests which extend forward from the seat back on one or both sides of the seat back. Typically, the armrest is positioned in an operative position relative to the seat back such that the armrest extends horizontally from the seat back when the seat back is in its upright position. When the seat back is reclined however, if the armrest is not adjustable, it will no longer be horizontal but will be upwardly inclined from the seat back.

Accordingly, it is an object of the present invention to provide an attitude adjustment mechanism to enable the armrest to be adjusted downwardly to a horizontal position when the seat back is reclined.

The present invention accomplishes this objective by utilizing a cam lock mechanism which enables the armrest to be positioned anywhere within a range of operative positions to accommodate a range of reclined seat back positions. The cam lock mechanism includes a cam plate fixed to the seat back and a pawl plate rotatably mounted to the armrest. The pawl plate is biased into engagement with the cam plate such that an edge surface of the pawl plate is in engagement with a edge surface of the cam plate to create an interference relationship between the cam plate and the pawl plate. The cam lock mechanism is a one-way acting lock which prevents downward rotation of the armrest but does not restrict upward rotation of the armrest.

A release mechanism is provided to move the pawl plate out of engagement with the cam plate to enable the armrest to be adjusted downwardly. The armrest can also be raised to a position parallel to the seat back in which the pawl plate edge surface no longer engages the cam plate edge surface. This enables the armrest to be lowered from the raised position without first actuating the release mechanism. When the armrest is lowered to the range of armrest operative positions, the pawl plate will engage the cam plate to lock the armrest in place. Further downward adjustment of the armrest requires actuation of the cam lock release mechanism.

Further objects, features and advantages of the invention will become apparent from a consideration of the following description and the appended claims when taken in connection with the accompanying drawings.

BRIEF DESCRIPTION OF THE DRAWINGS

FIG. 2 is an elevational view of the armrest interior showing the attitude adjustment mechanism;

FIG. 3 is a sectional view of the attitude adjustment mechanism as seen from the line 3—3 in FIG. 2;

DETAILED DESCRIPTION OF THE PREFERRED EMBODIMENT

Figure 1:
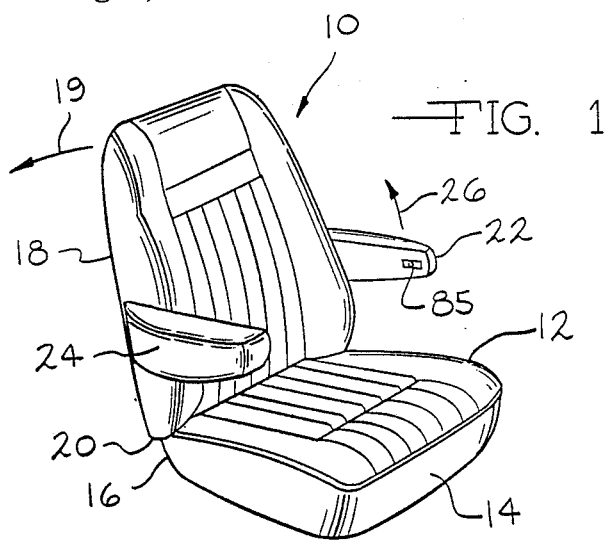
FIG. 1 is a perspective view of a vehicle seat assembly having an attitude adjustable armrest according to this invention.

A vehicle seat assembly having an attitude adjustable armrest of the present invention is shown in FIG. 1 and designated generally at 10. The vehicle seat assembly 10 includes a lower seat cushion 12 having a forward end 14 and a rearward end 16. Extending upwardly, in a generally upright position from the rearward end of the seat cushion 12, is a seat back 18. The seat back 18 is pivotally connected at its lower end 20 to the rearward end 16 of the seat cushion 12. The seat back 18 may be reclined rearwardly from the upright position in the direction of arrow 19 within a range of reclined positions to enable the seat back to be adjusted as desired by the seat occupant. Extending forwardly from the side of the seat back are arm rests 22 and 24.

Figure 5:
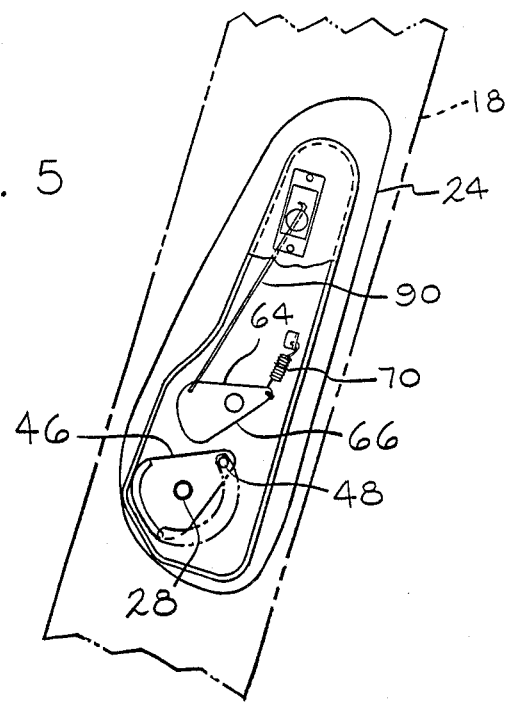
FIG. 5 is a side elevational view of the armrest in a raised position alongside the seat back shown in broken lines.

The vehicle seat assembly 10 can be used in a passenger vehicle as a bucket seat and can also be used in larger vehicles such as pick-up trucks, vans and other recreational vehicles. Depending on the usage of the seat assembly 10, one of the two armrests 22 or 24 may be deleted with the vehicle door interior trim panel providing an armrest for the seat occupant on the outboard side of the seat assembly. The armrests 22 and 24 are pivotally mounted to the seat back to enable the armrests to be raised as shown by arrow 26 in FIG. 1 to a position along side and parallel to the seat back as shown in FIG. 5.

The armrests 22 and 24 are shown in an operative position in FIG. 1 in which they extend forwardly from the seat back in a generally horizontal position or attitude. When a seat occupant reclines the seat back 18 the attitude of the armrests will change from a horizontal position to a position in which the armrests are inclined upwardly in a forward direction. The vehicle seat assembly of the present invention includes an attitude adjustment mechanism to enable the attitude of the armrests to be adjusted downwardly, to a horizontal position, after the seat back is reclined.

Figure 4:
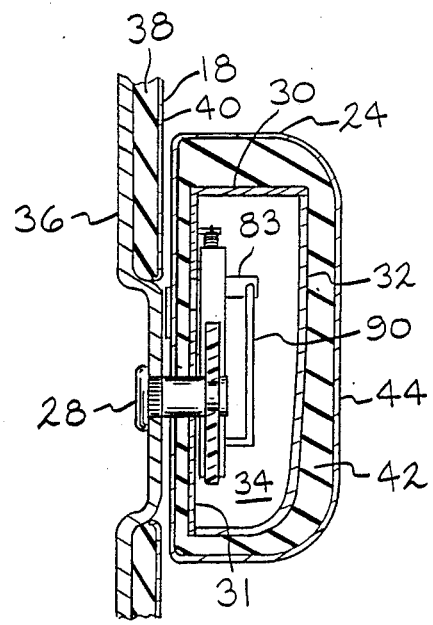
FIG. 4 is a sectional view of the attitude adjustment mechanism as seen from the line 4—4 in FIG. 2.

The attitude adjustment mechanism is best described with reference to FIGS. 2-4. The armrest 24 is constructed upon a frame 30 which is L-shaped in cross-section as shown in FIG. 3 and includes a vertical frame member 31. A cover panel 32 is attached to the frame 30 to form a hollow interior chamber 34 which houses the attitude adjustment mechanism of the armrest. The cover panel 32 is necessary to enclose the adjustment mechanism to protect the mechanism when the foam padding 42 is molded onto the armrest. The cover panel 32 is attached to the frame 30 by conventional fasteners such as screws, bolts, or the like, (not shown).

The armrest frame 30 is pivotally mounted to a main pivot 28 secured to the seat back support frame 36. The main pivot 28 extends through the vertical frame member 31 and has an axis 29 substantially perpendicular to the frame member 31. The seat back support frame 36 is covered by a foam pad 38 and an upholstery cover 40. The armrest frame 30 is encapsulated in the foam body 42 which is covered with an armrest upholstery cover 44 to form the exterior surface of the armrest.

The armrest attitude adjustment mechanism includes a cam plate 46 which is disposed within the armrest interior chamber 34 and is fixed to the seat back frame 36 by the main pivot 28 and a mounting post 48. The mounting post 48 extends through an arcuate slot 50 in the armrest vertical frame member 31. The slot 50 is concentric about the main pivot 28. The two ends 52 and 54 of the arcuate slot 50 serve as rotation stops for the armrest 24. When the armrest 24 is rotated to a raised position along side the seat back 18, the slot end 52 will engage the mounting post 48 to stop the rotational motion of the armrest 24. Likewise, when the armrest is adjusted downwardly about the main pivot 28, i.e. rotated counterclockwise as viewed in FIG. 2, the other slot end 54 will engage the mounting post 48 to stop the rotational motion of the armrest.

The cam plate 46 includes an arcuate cam edge surface 56 having a radius of curvature $R_1$ concentric about the main pivot 28. The cam surface 56 is a beveled edge having two inclined surfaces 60 and 62 shown in FIG. 3.

The adjustment mechanism of the armrest also includes a secondary pivot 64 attached to the armrest frame 30 which is used to rotatably carry a pawl plate 66. The secondary pivot 64 has an axis 65 which is parallel to the axis 29 of main pivot 28. The pawl plate 66 has a grooved edge 68 forming an edge surface for engagement with the beveled cam edge surface 56. The pawl plate 66 is biased into a position in which the grooved edge surface 68 engages the cam surface 56 by a biasing spring 70. Biasing spring 70 is attached at one end to the armrest frame 30 by a mounting tab 72 and attached at the its other end to the pawl plate 66 through aperture 74.

A triangle ABC is formed by point A at the engagement of the cam plate 46 and pawl plate 66, point B at the center of the main pivot 28 and point C at the center of secondary pivot 64. The point A is positioned vertically below the line BC of the triangle. When a force is applied to the armrest in a direction to rotate the armrest downwardly, the friction forces at the engagement of the pawl plate and cam plate act upon the pawl plate in an upward direction so as to urge the pawl plate to rotate in a counterclockwise direction, as viewed in FIG. 2, toward the cam plate. This increases the engagement force between the pawl plate and the cam plate, further increasing the friction forces and preventing the pawl plate edge surface from sliding relative to the cam plate, thereby preventing downward rotation of the armrest. The attitude adjustment mechanism thus operates as a cam lock to hold the armrest in place.

A release mechanism is provided to disengage the pawl plate from the cam plate to enable the armrest to be adjusted downwardly after the seat back has been reclined. The release mechanism includes a lever 80 having two radially extending lever arms 81 and 83. Lever 80 is pivotally is pivotally mounted to a decorative cover plate 82 by a pin 86. Lever arm 81 includes a button 85 which projects through an aperture 87 in the cover plate to be accessible from the exterior of the armrest. A connecting rod 90 is connected to the end of lever arm 83 and extends from the lever arm at an angle such that rod 90 moves substantially in translation in response to rotation of the lever 80 about the pin 86.

The other end of the rod 90 is connected to pawl plate 66 through aperture 92 in the pawl plate. The aperture 92 in pawl plate 66 is positioned relative to the secondary pivot 64 and the aperture 74 such that translation of the rod 90, in response to depression of the button 85, will cause the pawl plate 66 to rotate in opposition to the biasing spring 70 and out of engagement with the cam plate 46. Once the pawl plate is disengaged, the armrest 24 can be rotated downwardly as desired by the occupant. Once the armrest has been positioned as desired, the button 85 is released, thereby allowing the biasing spring 70 to urge the pawl plate into engagement with the cam plate 46, thus locking the armrest in position.

The cam lock is only operable to prevent downward rotation of the armrest. A force acting on the armrest to rotate the armrest upwardly, creates friction forces on the pawl plate in a generally downward direction at point A. These friction forces act to urge the pawl plate to rotate in a clockwise direction as viewed in FIG. 2, away from the cam plate. This reduces the engagement force between the pawl plate and the cam plate such that the pawl plate will slide along the edge of the cam plate, thus allowing the armrest to be raised.

The attitude adjustment mechanism is designed to provide a predetermined angular range of motion of the armrest. This range of motion provides for horizontal positioning of the armrest when the seat back is in its upright position and in any reclined position. In the range of arm rests positions, the pawl plate engages the cam plate at point A along the cam edge surface 56.

When the armrest is rotated to a raised position along side the seat back, the pawl plate is disengaged from the cam surface as shown in FIG. 5. In the raised position, the release rod 90 resists rotational motion of the pawl plate 66 induced by the biasing spring 70 to hold the pawl plate in place. Because the pawl plate and ca plate are disengaged with the armrest raised, it is not necessary to actuate the release mechanism prior to lowering the armrest from the raised position. Once the armrest is lowered to the beginning of the range of armrest operative positions, the pawl plate engages the cam plate and armrest rotation is stopped. The release mechanism must be actuated to further rotate the armrest downwardly.

Figure 6:
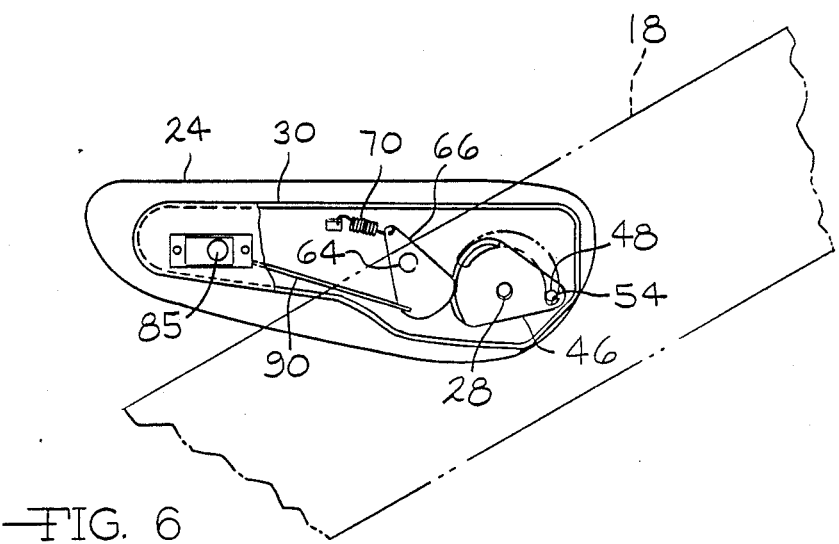
FIG. 6 is a side elevational view of the armrest showing the armrest adjusted to a horizontal position with the seat back in broken lines in a reclined position.

In FIG. 6, the seat back is shown in the fully reclined position and the armrest attitude has been adjusted to a horizontal position. The end 54 of slot 59 engages the pin 48 to stop the downward rotation of the armrest.

The one-way cam lock provides an attitude adjustment to the armrest to enable the armrest to be adjusted to a horizontal position when the seat back is reclined. The pawl plate automatically engages the cam plate when the armrest is lowered to form the cam lock to hold the armrest in position and prevent downward rotation of the armrest. An increasing force to rotate the armrest downwardly will act in a manner so as to increase the forces locking the armrest in position. Upward forces on the armrest releases the cam lock allowing the armrest to rotate upwardly.

It is to be understood that the invention is not limited to the exact construction illustrated and described above, but that various changes and modifications may be made without departing from the spirit and scope of the invention as defined in the following claims.

What is claimed is:

1. A vehicle seat assembly comprising:
a generally horizontal lower seat cushion having a rear end;
a seat back extending upwardly from the rear end of said seat cushion in a substantially upright position, said seat back being pivotally mounted to enable said seat back to be reclined rearwardly from said upright position as desired by a seat occupant;
at least one armrest mounted to said seat back and extending forwardly from said seat back in an operative position, said armrest being pivotally mounted to said sat back about a main pivot having a first axis to enable the armrest to be raised to an upright position adjacent said seat back; and
lock means operatively associated with said armrest for preventing downward rotation of said armrest from said operative position, said lock means including a stationary cam member mounted to said seat back, a locking member pivotally mounted to said armrest about a secondary pivot having a second axis parallel to said first axis, and means for biasing said locking member into surface to surface engagement with said cam member with an engagement force sufficient to enable friction forces acting on said locking member in response to downward rotation forces on said armrest to urge said locking member to pivot toward said cam member to increase the engagement force between the locking member and the cam member to prevent sliding motion of the locking member relative to the cam member to lock the armrest in said operative position.

2. The seat assembly of claim 1 wherein friction forces acting on said locking member in response to upward rotation forces on said armrest urge said locking member to pivot away from said cam member to decrease the engagement force between the locking member and cam member to enable the locking member to slide relative to the cam plate to enable upward rotation of the armrest.

3. The seat assembly of claim 2 further comprising means selectively operable for disengaging said locking member from said cam member by pivoting said locking member in opposition to said biasing means to enable said armrest to be downwardly rotated as desired by a seat occupant.

4. The seat assembly of claim 2 wherein said cam member is mounted to said main pivot, said cam member having an arcuate edge surface concentric about said main pivot, and said locking member having an edge surface which engages the edge surface of said cam member when said locking member engages said cam member.

5. The seat assembly of claim 4 wherein said secondary pivot is disposed forwardly of said main pivot and said locking member engages said cam member at a point below a line defined by said main and secondary pivots.

6. A vehicle seat assembly comprising:
a generally horizontal lower seat cushion having a rear end;
a seat back extending upwardly from the rear end of said seat cushion in a substantially upright position, said seat back being pivotally mounted to enable said seat back to be reclined rearwardly from said upright position as desired by a seat occupant;
at least one armrest mounted to said seat back and extending forwardly from said seat back in an operative position, said armrest being pivotally mounted to said seat back about a main pivot having a first axis to enable the arm rest to be raised to an upright position adjacent said seat back, said armrest having a hollow interior; and
a cam plate within said hollow interior fixedly mounted to said main pivot and having an arcuate edge surface concentric about said main pivot;
a locking plate within said hollow interior and pivotally mounted about a secondary pivot having a second axis parallel to said first axis, said locking plate having an edge surface; and
means for biasing said locking plate edge surface into engagement with said cam plate edge surface with an engagement force sufficient to enable friction forces acting on said locking plate in response to downward rotation forces on said armrest to urge said locking plate to pivot toward said cam plate to increase the engagement forces between said locking plate and said cam plate to prevent sliding of said locking plate relative to said cam plate to hold said armrest in said operative position and prevent downward rotation of said armrest.

7. The seat assembly of claim 6 wherein said secondary pivot is disposed forwardly of said main pivot and said locking plate engages said cam plate at a location below a line defined by said main and secondary pivots.

8. The seat assembly of claim 6 further comprising means for disengaging said locking plate by pivoting said locking plate in opposition to said biasing means to enable said armrest to be downwardly rotated.

9. The seat assembly of claim 6 wherein one of said cam plate edge surface and said locking plate edge surface is beveled and the other of said cam plate edge surface and said locking plate edge surface is grooved to receive the beveled edge surface.

10. The seat assembly of claim 9 wherein said cam plate edge is beveled and said locking plate edge surface is grooved.

11. The seat assembly of claim 6 wherein said frame includes a frame member substantially perpendicular to said main pivot and through which said main pivot extends, said frame member forming an arcuate slot concentric about said main pivot, said slot having two ends;
a post projecting from said seat through said slot in the frame member, said post being substantially parallel the axis of the main pivot; and
said post being operable to stop rotation of said armrest when said post engages the ends of the slot.

12. A vehicle seat assembly comprising:
a generally horizontal low seat cushion having a rear end;
a seat back extending upwardly from the rear of said seat cushion in a substantially upright position,
at least one armrest pivotally mounted to said seat back and extending forwardly from said back in an operative position within a predetermined range of angles relative to said seat back,
lock means disposed within said armrest for locking said armrest in said operative position to prevent downward rotation of said armrest, said lock means including a stationary member mounted to said seat back having an arcuate edge surface concentric about said pivot, a locking member pivotally mounted to said armrest about a second pivot, and means for biasing said locking member into surface to surface engagement with said stationary member arcuate surface with sufficient force that friction between said locking and stationary members prevents sliding of said members relative to one another in response to a downward force on said armrest whereby said lock means holds said armrest in said operative position.

13. The seat assembly of claim 12 wherein said armrest is pivotable from said operative position to a raised position substantially alongside said seat back, said lock means being operable only over a portion of said armrest pivotal motion including said predetermined range of angles forming said operative position whereby said armrest can be pivoted downward from said raised position alongside said seat back to said operative position without actuation of said release means.

14. The seat assembly of claim 12 further comprising lock release means for pivotally moving said locking member from engagement with said stationary member to enable downward rotation of said armrest.

* * * * *